United States Patent
Scholle (10) Patent No.: US 9,651,119 B2
(45) Date of Patent: *May 16, 2017

(54) HYBRID DRIVE DEVICE FOR A MOTOR VEHICLE

(71) Applicant: Audi AG, Ingolstadt (DE)

(72) Inventor: Tassilo Scholle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/913,256

(22) PCT Filed: Aug. 1, 2014

(86) PCT No.: PCT/EP2014/002132
§ 371 (c)(1),
(2) Date: Feb. 19, 2016

(87) PCT Pub. No.: WO2015/024630
PCT Pub. Date: Feb. 26, 2015

(65) Prior Publication Data
US 2016/0201770 A1    Jul. 14, 2016

(30) Foreign Application Priority Data

Aug. 21, 2013  (DE) .................. 10 2013 013 955

(51) Int. Cl.
*F16H 3/72*        (2006.01)
*B60W 10/02*       (2006.01)
(Continued)

(52) U.S. Cl.
CPC ............ *F16H 3/725* (2013.01); *B60K 6/365* (2013.01); *B60K 6/387* (2013.01); *B60K 6/48* (2013.01);
(Continued)

(58) Field of Classification Search
None
See application file for complete search history.

(56) References Cited

U.S. PATENT DOCUMENTS 7,220,201 B2 * 5/2007 Raghavan .............. B60K 6/365
                                                        475/4
7,273,435 B2 * 9/2007 Raghavan .............. B60K 6/365
                                                      475/151
(Continued)

FOREIGN PATENT DOCUMENTS

| DE | 38 25 286 | 9/1989 |
|----|-----------|--------|
| DE | 102004026252 | 2/2005 |
| DE | 102011120576 | 6/2012 |
| DE | 102011005531 | 9/2012 |
| DE | 102012214266 | 2/2013 |
| DE | 102011088669 | 6/2013 |
| DE | 102012201376 | 8/2013 |
| WO | WO 2013/083337 | 6/2013 |

OTHER PUBLICATIONS

International Search Report issued by the European Patent Office in International Application PCT/EP2014/002132 on Dec. 1, 2014.

*Primary Examiner* — Dirk Wright (74) *Attorney, Agent, or Firm* — Henry M. Feiereisen LLC.

(57) ABSTRACT

A hybrid drive device for a motor vehicle includes an internal combustion engine, an electric machine, and two planetary gear trains which are shiftable into different gear stages by shifting elements and which are connectable via input elements and output elements with a driven input shaft and an output shaft and have shiftable transmission elements that can be coupled or braked. The internal combustion engine is in driving relation to a first input shaft and the electric machine is in driving relation to a second coaxial input shaft. The two planetary gear trains are coupled to each other such that, when the shifting elements are activated, shifting of four forward gears can be implemented via the internal combustion engine and shifting of three forward gears or reverse gears can be implemented via the electric machine.

10 Claims, 7 Drawing Sheets

(51) Int. Cl.
*B60K 6/387* (2007.10)
*F16D 25/06* (2006.01)
*B60K 6/365* (2007.10)
*B60K 6/48* (2007.10)
*B60W 10/115* (2012.01)
*B60W 20/00* (2016.01)
*F16H 63/30* (2006.01)
*F16H 63/34* (2006.01)
*F16H 61/30* (2006.01)
*B60W 10/196* (2012.01)

(52) U.S. Cl.
CPC .......... *B60W 10/02* (2013.01); *B60W 10/115* (2013.01); *B60W 20/00* (2013.01); *F16D 25/06* (2013.01); *F16H 63/3023* (2013.01); *F16H 63/3026* (2013.01); *F16H 63/3416* (2013.01); *F16H 63/3441* (2013.01); *B60K 2006/4841* (2013.01); *B60W 10/196* (2013.01); *B60W 2540/16* (2013.01); *B60W 2710/021* (2013.01); *B60W 2710/18* (2013.01); *B60Y 2200/92* (2013.01); *B60Y 2400/406* (2013.01); *B60Y 2400/73* (2013.01); *F16H 2061/307* (2013.01); *F16H 2200/0043* (2013.01); *F16H 2200/2007* (2013.01); *F16H 2200/2064* (2013.01); *F16H 2200/2094* (2013.01); *Y10S 903/911* (2013.01); *Y10S 903/914* (2013.01)

(56) References Cited

U.S. PATENT DOCUMENTS

| | | | | |
|---|---|---|---|---|
| 7,288,041 | B2 * | 10/2007 | Bucknor | B60K 6/40 |
| | | | | 475/10 |
| 7,300,374 | B2 * | 11/2007 | Bucknor | B60K 6/387 |
| | | | | 475/5 |
| 7,455,609 | B2 * | 11/2008 | Raghavan | B60K 6/48 |
| | | | | 475/284 |
| 7,473,199 | B2 * | 1/2009 | Bucknor | B60K 6/365 |
| | | | | 475/5 |
| 8,029,404 | B2 * | 10/2011 | Borgerson | B60K 6/383 |
| | | | | 475/280 |
| 8,556,053 | B2 | 10/2013 | Jakob-Bodenhagen et al. | |
| 8,870,706 | B2 * | 10/2014 | Imamura | B60K 6/365 |
| | | | | 475/282 |
| 9,020,675 | B2 * | 4/2015 | Park | B60W 10/06 |
| | | | | 180/65.265 |
| 9,114,699 | B2 * | 8/2015 | Takei | B60K 6/365 |
| 9,475,478 | B2 * | 10/2016 | Kodama | B60W 20/15 |
| 2007/0275808 | A1 | 11/2007 | Iwanaka et al. | |
| 2011/0136608 | A1 | 6/2011 | Kim et al. | |
| 2013/0045826 | A1 | 2/2013 | Wittkopp et al. | |
| 2013/0345010 | A1 | 12/2013 | Kaltenbach et al. | |
| 2016/0201769 | A1 * | 7/2016 | Scholle | B60K 6/365 |
| | | | | 475/5 |

* cited by examiner

HYBRID DRIVE DEVICE FOR A MOTOR VEHICLE

CROSS-REFERENCES TO RELATED APPLICATIONS

This application is the U.S. National Stage of International Application No. PCT/EP2014/002132, filed Aug. 1, 2014, which designated the United States and has been published as International Publication No. WO 2015/024630 and which claims the priority of German Patent Application, Serial No. 10 2013 013 955.4, filed Aug. 21, 2013, pursuant to 35 U.S.C. 119(a)-(d).

BACKGROUND OF THE INVENTION.

The present invention relates to a hybrid drive device for a motor vehicle.

A hybrid drive device of the generic type is disclosed, for example, in US 2011/0136608 A1 and includes as power sources an internal combustion engine and an electric machine in driving relation, separately or together, to a transmission having several gear stages. The transmission is hereby formed by two planetary gear trains which are coupled with one another and can be shifted by several brakes and clutches and which are coaxially aligned with the two driving transmission input shafts. The use of planetary gear trains enables a short and compact construction of the hybrid drive device, so that, for example, a transverse installation is possible in motor vehicles. The arrangement of the electric machine should also be such that in addition to its driving function, a use thereof as a generator to produce power and, optionally, as a starter for the internal combustion engine becomes possible and also to realize a reverse gear when reversing the rotation direction.

SUMMARY OF THE INVENTION

The object of the invention is to provide a hybrid drive device which is simpler in structure and more compact and permits greater degrees of freedom in addition to beneficial gear ratios in terms of the transmission.

In accordance with the invention, the object is achieved by a hybrid drive device for motor vehicles, comprising an internal combustion engine, an electric machine, and two planetary gear trains which are coupled to one another and shiftable into different gear stages by shifting elements and which are connectable via input elements and output elements with a driven input shaft and an output shaft and have shiftable transmission elements that can be coupled or braked, wherein the internal combustion engine is in driving relation to a first input shaft and the electric machine is in driving relation to a second coaxial input shaft, and that the two planetary gear trains are coupled to one another such that shifting of four forward gears can be implemented via the internal combustion engine and shifting of three forward and/or reverse gears can be implemented via the electric machine, when shifting elements are activated. This results in a particularly beneficial operational capability in both the combustion engine drive with acceptable gear steppings and wide transmission spacing, and the electromotive drive for the lower and middle speed range of the motor vehicle. By reversing the rotation direction of the electric machine, the reverse gears can be formed.

Advantageous refinements and configurations of the invention are set forth in the dependent claims.

According to an advantageous refinement of the invention, it is proposed to form at least two of the shifting elements by a clutch and a shiftable, positively acting shifting element, such as a claw clutch, which are connected on series in the force flux. This simplifies the hydraulic control and arrangement of the clutch elements since only one clutch can be used to activate two shifting elements, with the respective positive shifting element (this may, for example, be a synchronous clutch, known per se, or a claw clutch) being switched accordingly.

The two shifting elements can be formed, especially preferred, by a clutch and the brake, wherein, when the positive shifting element is switched, the clutch in the closed state connects either two transmission elements of the planetary gear trains or connects a transmission element upon a housing-fixed support element.

According to a further advantageous configuration of the invention, the positive shifting element may be switched to realize a parking lock P which acts on the output shaft so that, optionally, the need for a separate parking lock device can be eliminated in the drive device and this function is assumed by the claw clutch.

The shifting sleeve of the positive shifting element is hereby able to assume a triple function to thereby connect with one another the housing-fixed support element, directly or indirectly, with the output shaft in the P position, the support element with the transmission element to be braked in the braking position, and the two transmission elements in the clutch position. As an alternative, the shifting sleeve of the positive shifting element may connect the housing-fixed support element with the one transmission element of the one planetary gear train (brake position) in one shift position, connect the two transmission elements of the planetary gear trains in the other shift position (gear position), with the support element being connected via the shifting element for implementation of the parking brake function in the gear position.

According to a further advantageous configuration of the invention, at least two of the shifting elements can be controlled by a single actuation device which acts on one or the other clutch. As a result, the clutches and in particular the hydraulic control thereof can be simplified and their space demand in the transmission housing can be reduced. The alternating actuation of two clutches (normally multi-disk clutches) requires the provision of only one actuating piston. In particular, the actuation device can be formed by a piston-cylinder unit which hydraulically operates one of the clutches from a center position in the one or the other direction. The dual-sided shifting of two clutches or brakes is preferably appropriate for actuations involving shifting of non-sequential gears.

Furthermore, the shifting elements can be formed by two clutches arranged in coaxial relationship and actuated via a rotating, hydraulic piston-cylinder unit, with the piston-cylinder unit acting on the clutches, arranged on both sides of one of the planetary gear trains, via conjointly rotating rod connections.

As an alternative, the piston-cylinder unit may be fixed to the housing and act upon the rotating clutch via an axial bearing.

Finally, the housing-fixed piston-cylinder unit can actuate the brake and a clutch of the planetary gear train, with the piston-cylinder unit actuating the brake directly and the corresponding clutch with interposition of the axial bearing.

BRIEF DESCRIPITON OF THE DRAWING

Several exemplary embodiments of the invention are illustrated hereinafter with further details. The drawing, depicting half-sided block diagrams, shows in.

DETAILED DESCRPITON OF PREFERRED EMBODIMENTS

Figure 1:
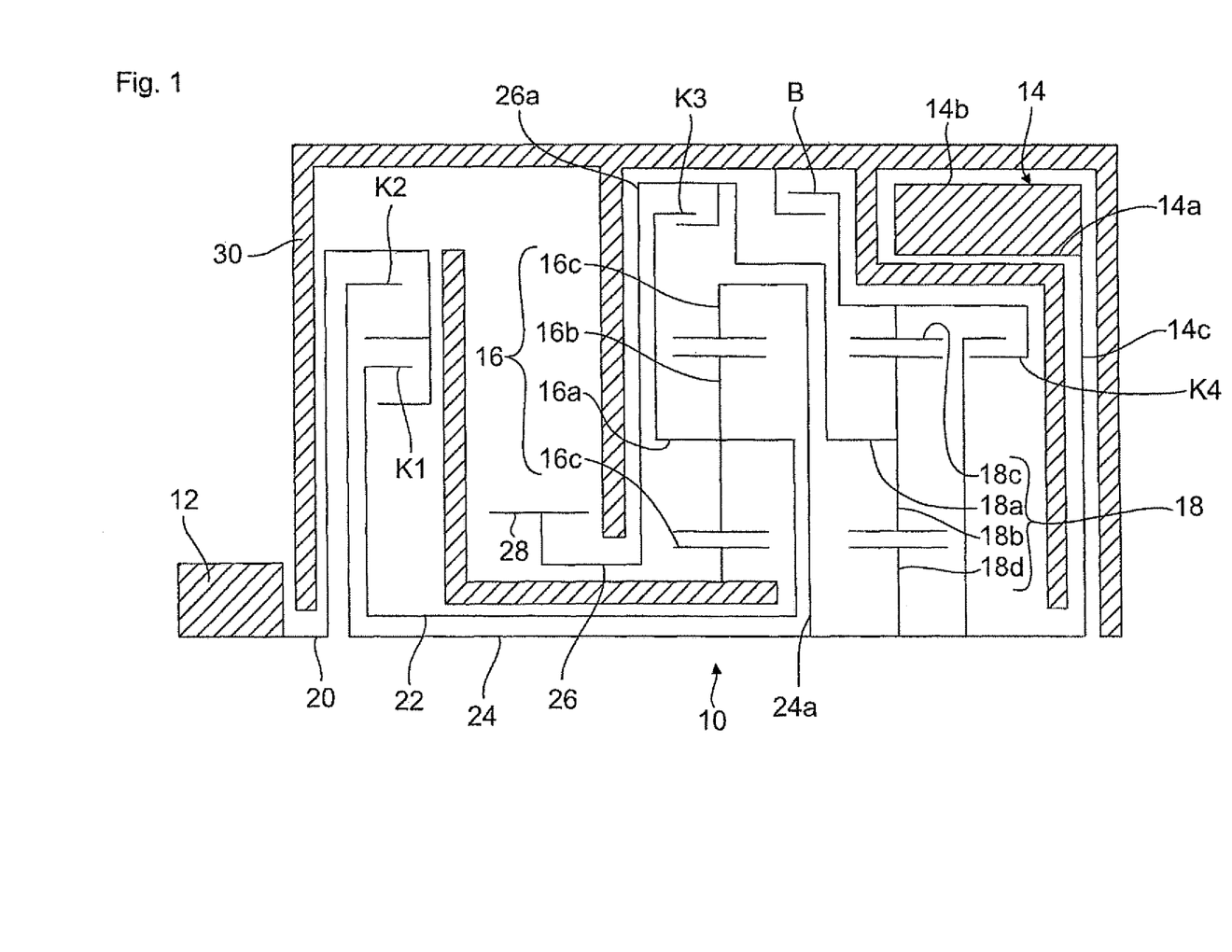
FIG. 1 a hybrid drive device for motor vehicles, including a driving internal combustion engine, an electric machine, and two planetary gear trains coupled to one another, with the gear stages being shiftable via four clutches and a brake.

FIG. 1 illustrates a hybrid drive device 10 for a motor vehicle, which is comprised essentially of an internal combustion engine 12, only hinted here, an electric machine 14, and two planetary gear trains 16, 18.

The internal combustion engine 12 can act with interposition of a torsional vibration damper or a dual mass flywheel upon a first input shaft 20, 22, whereas the electric machine 14 is in driving relation to a second coaxial input shaft 24. 26 designates an output shaft which is drivingly connected, for example via a gear 28 and via further, not shown transmission elements with an axle differential of the motor vehicle.

The electric machine 14 can be configured, as illustrated, in hollow shaft construction, wherein the rotor 14a and the preferably housing-fixed stator 14b can be positioned, at least in part, about the planetary gear train 18, and the rotor 14a can be in driving relation to the input shaft 24 via a flange 14c. The electric machine 14 may also be placed directly onto the input shaft 24.

The shafts 20, 22, 24 are mounted coaxially in the transmission housing 30 of the drive device 10, with the shaft 22 being configured as hollow shaft.

The input shaft 20, 22 on the side of the internal combustion engine drives via a clutch K1 either the spider 16a of the planetary gear train 16 that supports the planet gears 16b, or the ring gear 16c of the planetary gear train 16 via a clutch K2 and via the input shaft 24. The ring gear 16c is fixedly connected by a connection flange 24a to the input shaft 24.

The clutches K1 and K2 can be constructed, according to FIG. 1, as double clutch and arranged radially above one another to realize an axially short construction.

The sun gear 16d of the planetary gear train 16 is firmly supported upon the housing, whereas the spider 16a is coupled via a third clutch K3 to a drum-shaped housing 26a of the output shaft 26.

The sun gear 18d of the second planetary gear train 18 is fixedly arranged on the second input shaft 24 and drivingly connected via the planetary gears 18b to the spider 18a. The ring gear 18c of the planetary gear train 28 can either be braked via a housing-fixed brake B or coupled via a fourth clutch K4 with the input shaft 24. The spider 18a is furthermore firmly connected in driving relation to the housing 26a of the output shaft 26.

The described coupling of the two planetary gear trains 16, 18 between the input shafts 20, 22, 24 and the output shaft 26 enables shifting, as described hereinafter, of four forward gears in the combustion engine drive and three forward gears in the electromotive drive, and a connection without drive between the internal combustion engine 12 and the electric machine 14, with the clutches K1 to K4 and the brake B being activated as follows:

| | | |
|---|---|---|
| Internal combustion engine 12 | forward gear 1 | K2 B |
| | forward gear 2 | K2, K3 |
| | forward gear 3 | K2, K4 |
| | forward gear 4 | K4, K1 |
| Electric machine 14 | forward gear 1 | B |
| | forward gear 2 | K3 |
| | forward gear 3 | K4 |
| Connection without drive between ICE and EM | | K1 (i = 1.6) |
| or | | K2 (i = 1.0) |

The planetary gear trains 16, 18 are configured in terms of gear ratio as negative-ratio gear train, with a stationary gear ratio $i_0$ of −1.65 of the planetary gear train 16 and a stationary gear ratio of $i_0$ of −1.95 of the planetary gear train 18.

Figure 2:
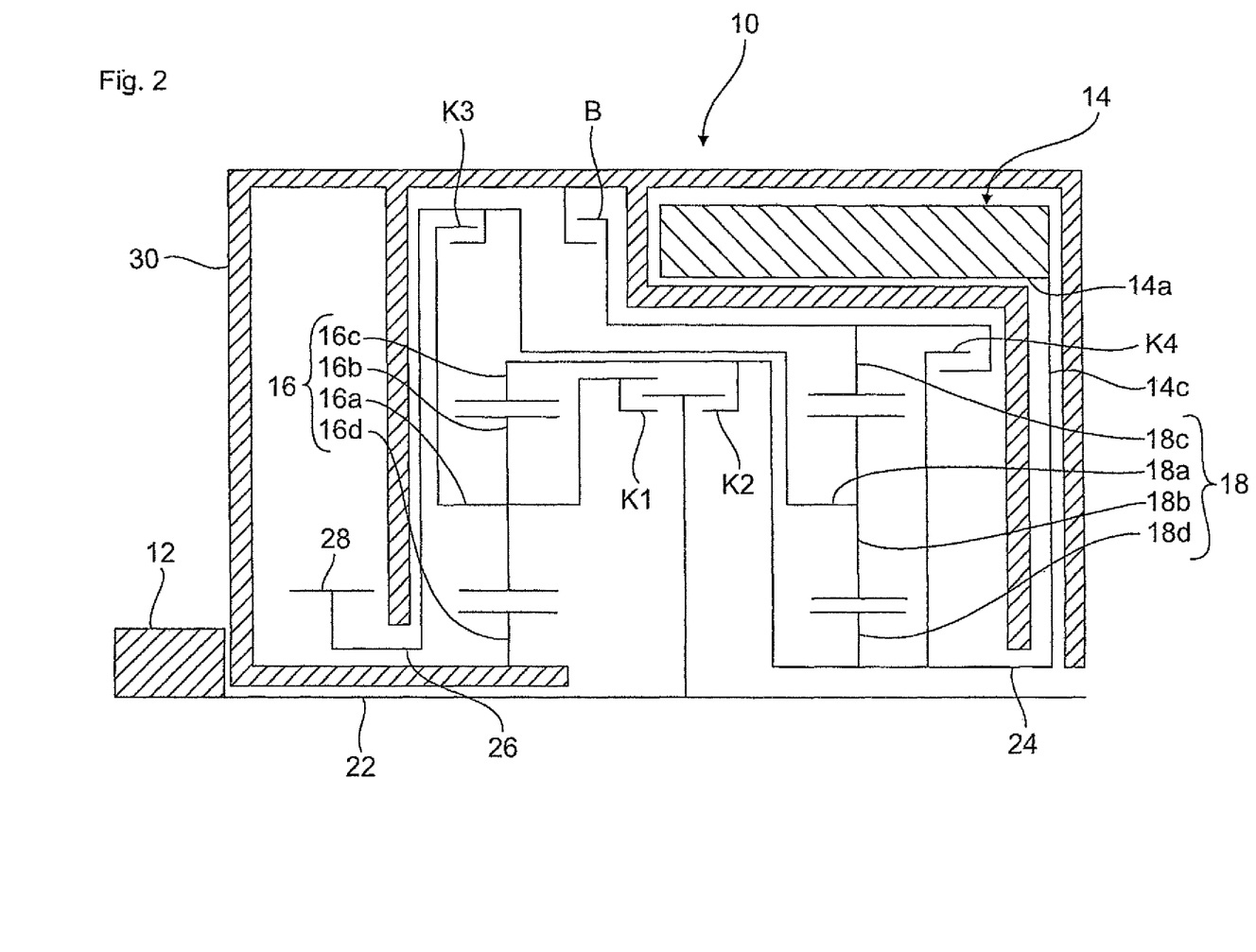
FIG. 2 a hybrid drive device as an alternative to FIG. 1 with modified arrangement of the clutches and the driving transmission input shafts.

Actuation of the clutches K1 to K4 and the brake B can be implemented hydraulically and/or electrically in a manner known per se, wherein the shifting elements according to FIGS. 1 and 2 can be configured preferably as multi-disk clutches. At least one of the clutches may hereby, optionally, be configured directly as starting clutch so as to eliminate the need for a distinct separating clutch. When the combustion engine is in the operating mode, the drive torque of the electric machine 14 can further be superimposed or added (boost mode) in the three forward gears through appropriate control.

FIG. 2 shows an alternative hybrid drive device 10, which, unless not described otherwise, is substantially of identical structure to and operates the same as in FIG. 1; functionally identical parts are provided with same reference signs.

The difference to FIG. 1 resides in the configuration of the clutches K1 and K2 as double clutch, which are axially aligned behind one another and positioned between the two planetary gear trains 16, 18.

When the planetary gear trains 16, 18 are coupled the same way by the shifting elements K1 to K4 and the brake B, the internal combustion engine 12 is hereby in driving relation to the spider 16a of the planetary gear train 16 via a first input shaft 22 and via the clutch K1, and to the ring gear 16c via the clutch K2. The input shaft 24 of the electric machine 14 is configured as hollow shaft and fixedly connected with the ring gear 16c of the planetary gear train 16 and the sun gear 18d of the second planetary gear train 18. Furthermore, the input shaft 24 can be coupled with the ring gear 18c via the clutch K4.

While the radially superimposed clutches K1, K2 (FIG. 1) require less space axially, the axially aligned arrangement according to FIG. 2 requires less installation space in the radial direction, which is of advantage in particular for positioning an electric machine 14 in hollow shaft construction.

FIGS. 3-7 show further modified actuations and arrangements of the shifting elements or the clutches K and the brake B of the hybrid drive devices according to FIGS. 1 and 2. Functionally identical parts are provided with same reference signs. To avoid repetitions, the description relates only to the essentially modified parts and functions.

Figure 3:
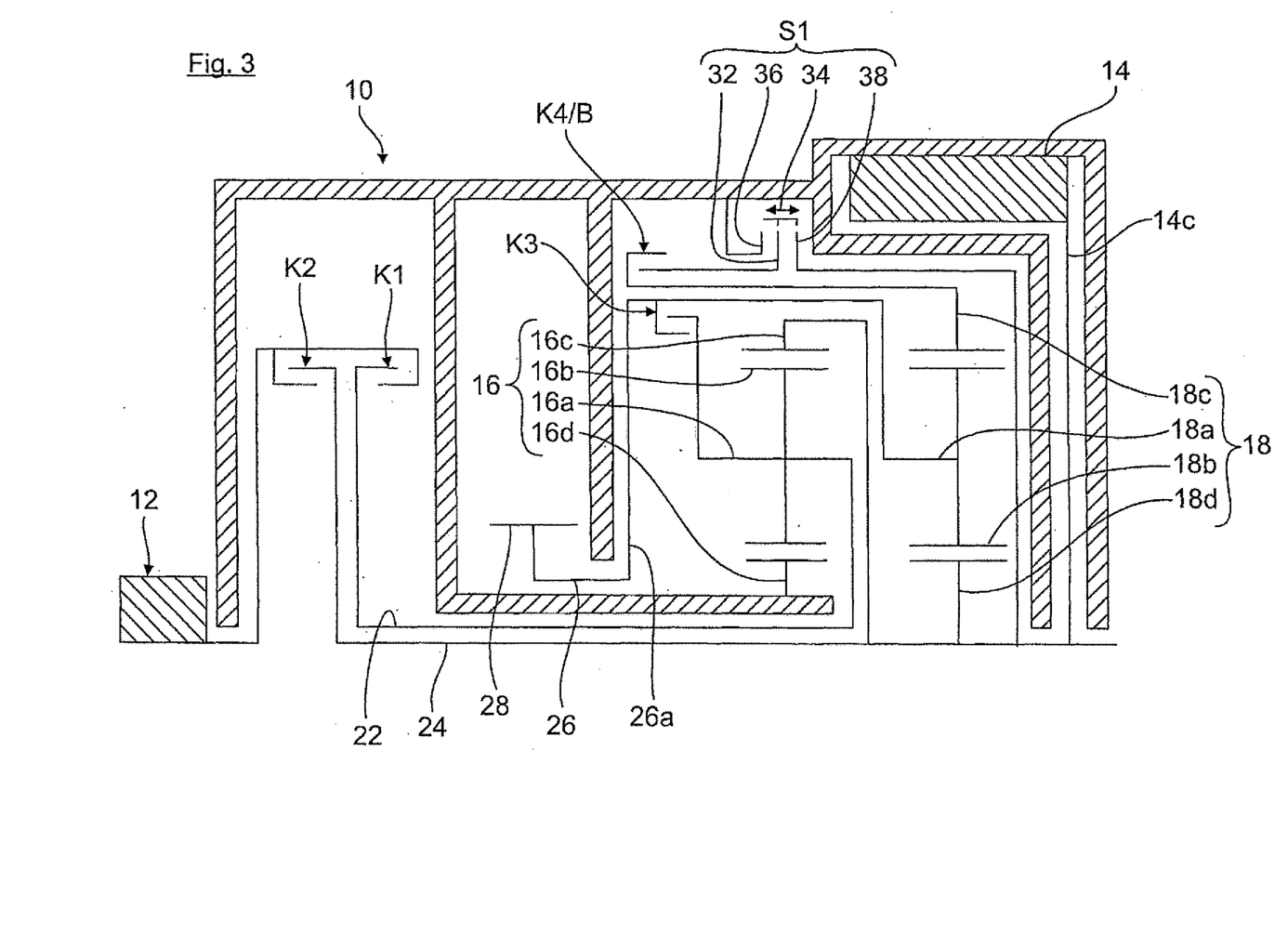
FIG. 3 the hybrid drive device according to FIG. 1 or 2 in which the brake and a clutch are operatively connected together by a positive shifting element.

According to FIG. 3, the clutch K4, firmly connected to the input shaft 24 and coupling the ring gear 18c of the planetary gear train 18, is combined with the brake B.

For this purpose, provision is made for a positively acting shifting element, such as a claw clutch S1, including a coupling body 32 which has a sliding toothing and which supports an internally toothed shifting sleeve 34 and is connected to the clutch K4. When the clutch K4 is open, the coupling body 32 is free to rotate or not drivingly connected.

The shifting sleeve 34 on the coupling body 32 can be connected via a not shown shifting actuation either to the outer toothing of a housing-fixed support element 36 or to the outer toothing of a drum-shaped element 38 which is fixedly connected to the input shaft 24.

The positive shifting element S1 can be configured, for example as a synchronizing clutch or a claw clutch, as known per se.

When the ring gear 18c of the planetary gear train 18 operates as brake, as described above, the shifting sleeve 34 is shifted via the support element 36, when the clutch K4 is open, and the clutch K4 is subsequently closed.

When the clutch K4 is opened and the shifting sleeve 34 is connected to the shifting element 38, the input shaft 24 is coupled to the ring gear 18c, as the clutch K4 is closed.

Figure 4:
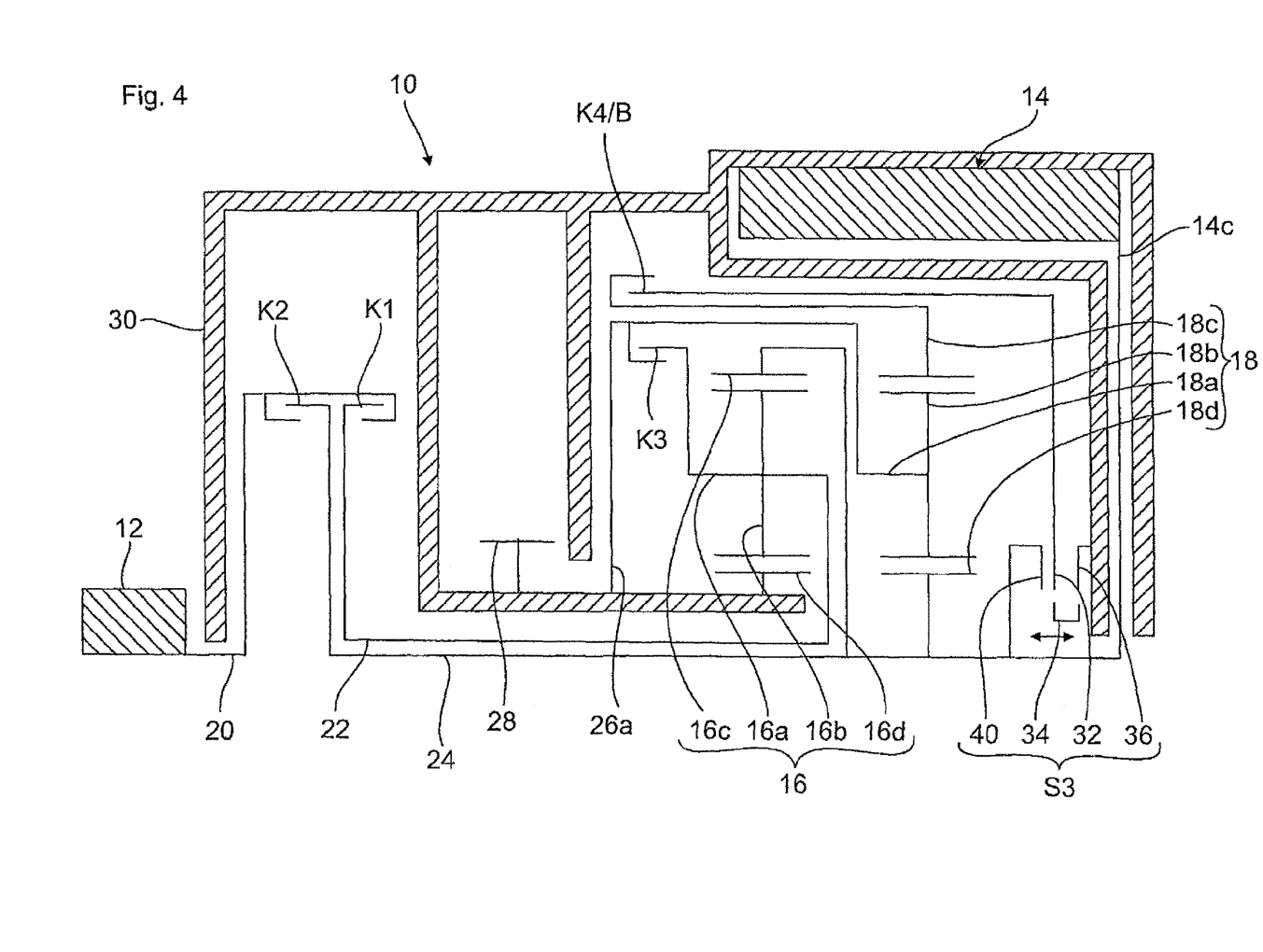
FIG. 4 a hybrid drive device as an alternative to FIG. 3 with a modified arrangement of the positively acting shifting element.

FIG. 4 shows a modified positive shifting element S3 compared to FIG. 3, specifically in a modified arrangement to a possibly smaller diameter. The shifting element (for example, a shifting sleeve) 34 has, compared to FIG. 3, an external shift engagement.

The functional activities are analogous to FIG. 3, when the clutch K4/B is actuated, but in modified arrangement and orientation.

Figure 5:
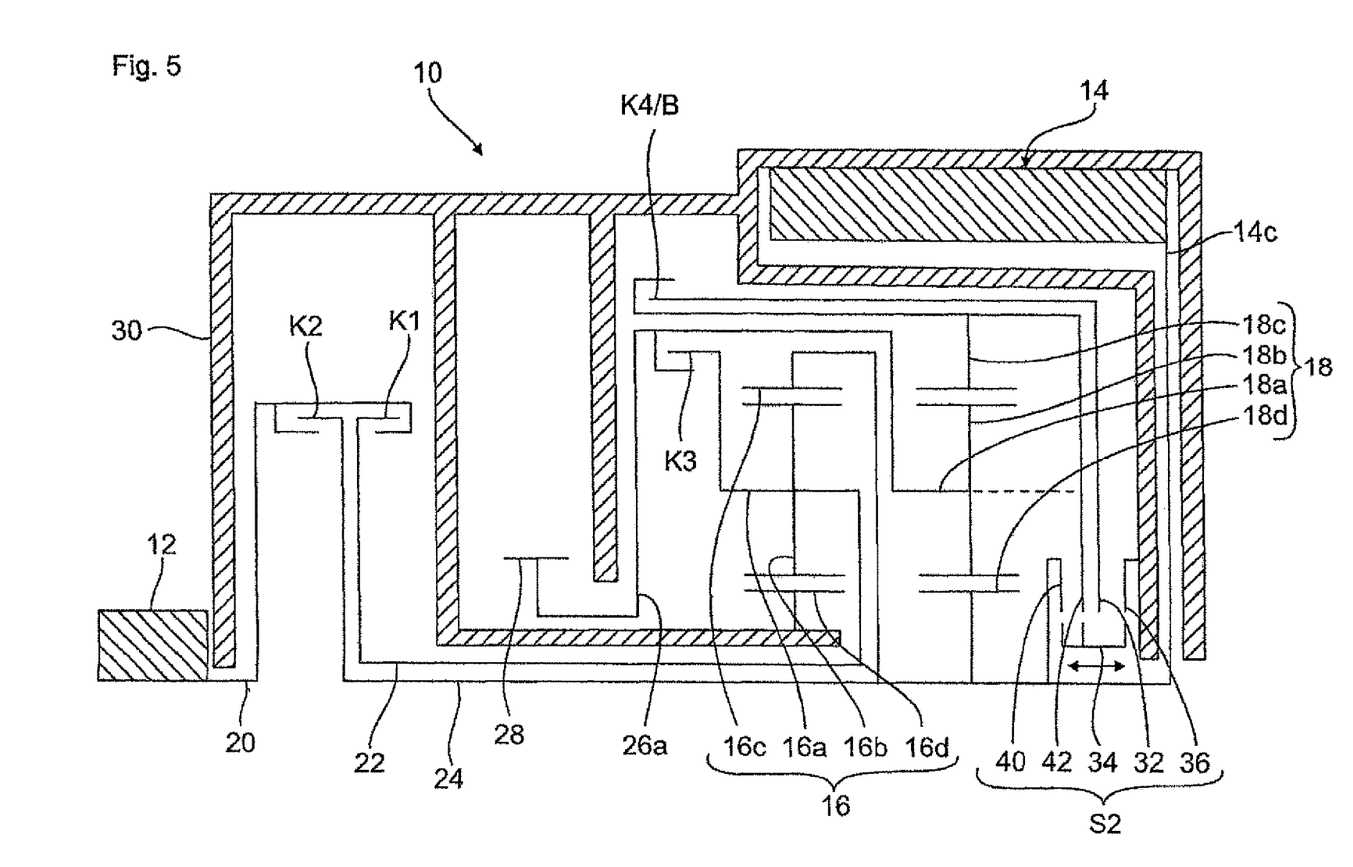
FIG. 5 a hybrid drive device as an alternative to FIG. 3, with the positively acting shifting element being switched to act as mechanical parking lock at the same time.

Compared to FIG. 3, FIG. 5 shows an expanded actuation of the shifting elements K4 and B, whereby the positive shifting element S2 is arranged axially adjacent to the planetary gear train 18 and expanded by the function of a mechanical parking lock P.

For this purpose, the positive shifting element S2 with its shifting sleeve 34, movable upon the coupling body 32, is formed such as to be able to assume, in addition to the shift positions described in FIG. 3, a third shift position (as shown) in which it connects the housing-fixed support element 36 with a shifting element 40, firmly arranged on the input shaft 24, and with a coupling element 42 of the ring gear 18c of the planetary gear train 18.

In this depicted shift position, the input shaft 24 or the sun gear 18d, firmly seated on the latter, and the ring gear 18c are connected together and the planetary gear train 18 is blocked and both are connected via the support element 36 with the housing. The spider 18a and the flange 26a also block the output shaft 26 corresponding to the function of a parking lock P. Optionally, the coupling element (for example, coupler gear) 42 can, as indicated in dashed lines, also be connected directly to the spider 18a of the planetary gear train 18.

Figure 6:
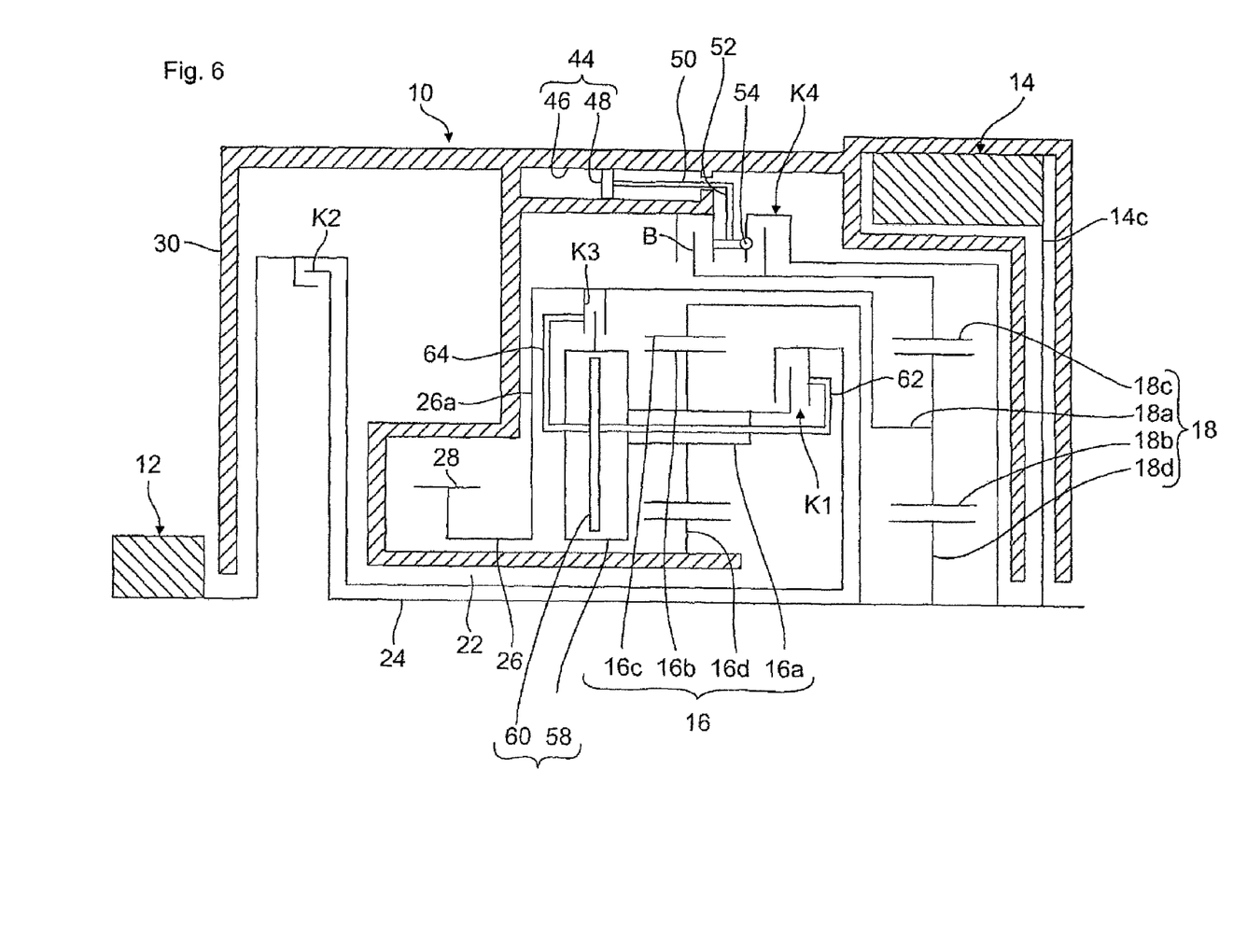
FIG. 6 a further hybrid drive device according to FIGS. 1 and 2, in which two shifting elements are actuated via piston-cylinder units acting on both sides.
Figure 7:
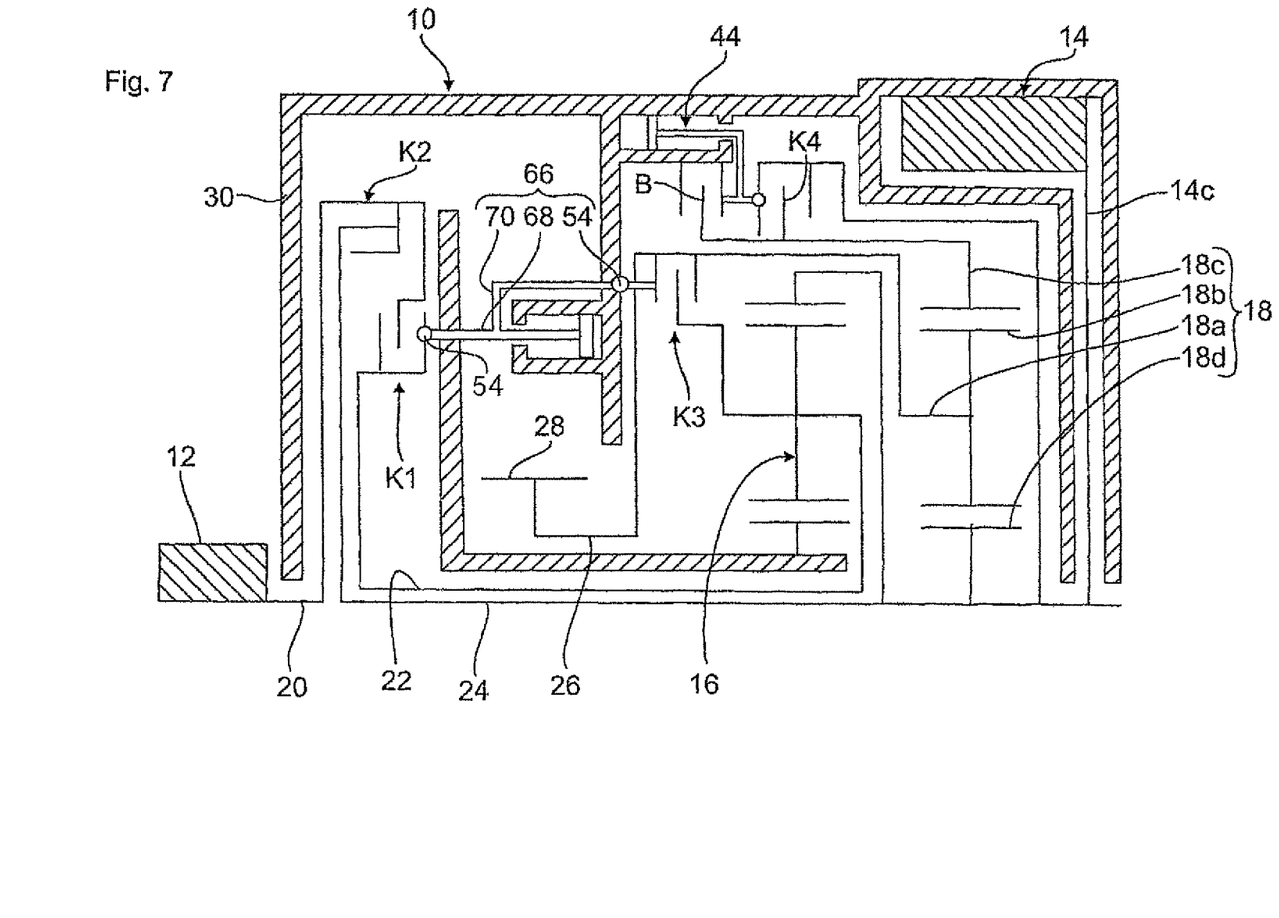
FIG. 7 a hybrid drive device as an alternative to FIG. 6, with two shifting elements being actuated on the housing side via piston-cylinder units.

FIGS. 6 and 7 illustrate embodiments of the invention as alternatives to FIGS. 3 to 5. Functionally identical parts are provided with like reference signs.

In FIG. 6, the clutch K4 and the brake B of the hybrid drive device 10 are actuated via a housing-fixed piston-cylinder unit 44, which has a cylinder 46 integrated in the housing 30 and guiding therein a piston 48 having a tappet 50 and a rod 52 to act directly on the brake B and on the clutch K4 via an axial bearing 54 (hinted only).

The cylinder 46, subdivided by the piston 48 into two chambers, is provided with two hydraulic ports (not shown) via which the piston 48 can be acted upon with hydraulic medium to move from a central position in opposite directions either to close the brake B (in the drawing to the left) or to close the clutch K4.

Furthermore, provision is made for a piston-cylinder unit 56 which is arranged between the flange 26a of the output shaft 26 and the planetary gear train 16 and conjointly rotates with the spider 16a and which enables alternating activation of the two clutches K1 and K3.

The piston-cylinder unit 56 has for this purpose an annular cylinder 58 in which an annular piston 60 is guided for axial movement from a central position in both directions and acts via a tappet 62, guided through the spider 16a which is supported by the pins of the planetary gears 16b, and a rod 64 upon the clutches K1 or K3 without the use of axial bearings 54.

The hydraulic chambers of the cylinder 58 that are subdivided by the piston 60 can be acted upon with hydraulic fluid via not shown hydraulic ports in a corresponding wall of the housing 30 (for example, rotary inlets) so that either the clutch K1 or the clutch K3 can be closed, as described above.

FIG. 7 shows an actuation of the clutches K1 and K3 of the hybrid drive device 10, as an alternative to FIG. 6, whereby provision is made for a piston-cylinder unit 66 which is integrated in the transmission housing 30 and comparable to the one in FIG. 6, reference signs 44, and which alternatingly acts upon the clutches K1 and K3, respectively, via a tappet 68 and a rod 70 with interposition of respective axial bearings 54.

The invention is not limited to the embodiments described. In particular, common variations and/or combinations between the illustrated FIGS. 1 to 7 in the arrangement of the shifting elements or the clutches K, the positive shifting elements S or of the piston-cylinder units 44, 56, 66, are possible for the artisan.

What is claimed is:

1. A hybrid drive device for a motor vehicle, comprising:
a first input shaft;
a second input shaft disposed in coaxial relationship to the first input shaft;
an output shaft;
an internal combustion engine in driving relation to the first input shaft;
an electric machine in driving relation to the second input shaft;
two planetary gear trains connectable via input elements and output elements with one of the first and second input shafts and the output shaft and including shiftable transmission elements that can be coupled or braked; and
shifting elements configured to shift the two planetary gear trains into different gear stages,
said two planetary gear trains being coupled to each other such that, when the shifting elements are activated, the internal combustion engine is capable for shifting of four forward gears and the electric machine is capable for shifting of three forward or reverse gears,
wherein at least two of the shifting elements are each formed by a clutch, and further comprising a single actuation device configured to control the at least two of the shifting elements by acting on the one or the other clutch.

2. The hybrid drive device of claim 1, wherein one of the shifting elements is formed by a clutch and another one of the shifting elements is formed by a shiftable, positive shifting element, said clutch and said positive shifting element being connected in series in a force flow.

3. The hybrid drive device of claim 2, wherein the positive shifting element is configured such that when the clutch is closed the positive shifting element connects in a first shift position two of the transmission elements to operate as clutch, and connects in a second shift position one of said two transmission elements to a housing-fixed support element so as to operate as a brake.

4. The hybrid drive device of claim 2, wherein the positive shifting element is shiftable to a third shift position to realize a parking lock that acts on the output shaft.

5. The hybrid drive device of claim 3, wherein the positive shifting element includes a shifting sleeve which connects in a third shift position the housing-fixed support element with the output shaft to realize a park position, connects in a brake position the support element with the one of said two transmission elements, and in a coupling position the two transmission elements.

6. The hybrid drive device of claim 3, wherein the positive shifting element includes a shifting sleeve which connects in the first shift position the support element with the one of said transmission elements which is part of one of the planetary gear trains, and in the second shift position the two transmission elements of the one of the planetary gear trains.

7. The hybrid drive device of claim 1, wherein the actuation device is formed by a piston-cylinder unit which acts from a central position hydraulically in one or another direction upon one of the at least two shifting elements.

8. The hybrid drive device of claim 7, wherein the clutches forming the at least two shifting elements are arranged in coaxial relationship on both sides of one of the planetary gear trains, said piston-cylinder unit constructed in the form of a rotating hydraulic piston-cylinder unit acting on the clutches via rod connections.

9. The hybrid drive device of claim 7, wherein the piston-cylinder unit is fixed to a housing and acts upon at least one of the clutches via at least one axial bearing.

10. The hybrid drive device of claim 1, wherein one of the shifting elements of one of the planetary gear trains operates as a clutch and another one of the shifting elements of the one planetary gear train operates as a brake, and further comprising an actuation device constructed in the form of a the piston-cylinder unit to operate the brake and the clutch, said piston-cylinder unit actuating directly the brake and the clutch with interposition of an axial bearing.

* * * * *